(12) United States Patent
Sonobe et al.

(10) Patent No.: US 7,781,370 B2
(45) Date of Patent: Aug. 24, 2010

(54) PROCESS FOR PRODUCING SPHERICAL ACTIVATED CARBON

(75) Inventors: Naohiro Sonobe, Fukushima-Ken (JP); Ikuo Seo, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 938 days.

(21) Appl. No.: 10/948,302

(22) Filed: Sep. 24, 2004

(65) Prior Publication Data

US 2005/0069481 A1 Mar. 31, 2005

(30) Foreign Application Priority Data

Sep. 25, 2003 (JP) .............................. 2003-334040

(51) Int. Cl.
*C01B 31/10* (2006.01)
(52) U.S. Cl. .......................................... 502/418; 502/8
(58) Field of Classification Search ......... 502/416–438, 502/8
See application file for complete search history.

(56) References Cited

U.S. PATENT DOCUMENTS

| 3,865,713 | A |   | 2/1975  | Kawai et al.            |
|-----------|---|---|---------|-------------------------|
| 3,909,449 | A | * | 9/1975  | Nagai et al. ...... 502/9 |
| 3,917,806 | A | * | 11/1975 | Amagi et al. ...... 423/460 |
| 3,953,345 | A | * | 4/1976  | Saito et al. ...... 502/9 |
| 4,009,232 | A | * | 2/1977  | Shiiki et al. ...... 264/9 |
| 4,045,368 | A | * | 8/1977  | Katori et al. ...... 502/9 |
| 4,273,675 | A | * | 6/1981  | Shiiki et al. ...... 502/9 |
| 5,356,574 | A | * | 10/1994 | Tamaki et al. ...... 264/29.2 |
| 5,446,005 | A | * | 8/1995  | Endo ...... 502/433 |
| 5,795,843 | A | * | 8/1998  | Endo ...... 502/416 |

FOREIGN PATENT DOCUMENTS

| FR | 2467177    | 4/1981 |
| GB | 1447076    | 8/1976 |
| JP | 51-76      | 1/1976 |
| JP | 59-10930   | 3/1984 |
| JP | 8-73863    | 3/1996 |
| JP | 2002-220592| 8/2002 |

OTHER PUBLICATIONS

Blanco et al., A Comparative Study of Air-Blown and Thermally Treated Coal-Tar Pitches, *Carbon*, vol. 38, pp. 517-523 (2000).
Prada et al., Preparation of Novel Ptiches by Tar Air-Blowing, *Carbon*, vol. 37, pp. 97-106 (1999).
Oh et al., Comparative Studies of the Modification of Coal-Tar Pitch, *Fuel*, vol. 78, pp. 1859-1865 (1999).
Machnikowski et al., Structural Modification of Coal-Tar Pitch Fractions During Mild Oxidation-Relevance to Carbonization Behavior, *Carbon*, vol. 40, pp. 1937-1947 (2002).
Fernández et al., Modification of Coal-Tar Pitch by Air-Blowing—I. Variation of Pitch Composition and Properties, *Carbon*, vol. 33, No. 3, pp. 295-307 (1995).

* cited by examiner

*Primary Examiner*—Stanley S. Silverman
*Assistant Examiner*—Daniel C. McCracken
(74) *Attorney, Agent, or Firm*—Wenderoth, Lind & Ponack, L.L.P.

(57) ABSTRACT

A spherical activated carbon is produced from a starting pitch obtainable from a heavy hydrocarbon oil, such as petroleum tar, coal tar or ethylene, through a moderate process. The starting pitch has a softening point of at least 150° C., a toluene-insoluble content of at least 40% and a property of retaining optical isotropy even after being heated at 430° C. for 1 hour. The starting pitch is converted into a porous spherical pitch, which is then infusibilized, carbonized and activated to provide a spherical activated carbon.

6 Claims, No Drawings

PROCESS FOR PRODUCING SPHERICAL ACTIVATED CARBON

FIELD OF THE INVENTION AND RELATED ART

The present invention relates to a novel process for producing spherical activated carbon through a porous spherical pitch.

Hitherto, as processes for producing spherical activated carbon, there have been proposed a process of using as a starting material a pitch (hereinafter called "crude oil-decomposition pitch") obtained by spraying crude oil into steam at 2000° C. to obtain a tar and removing a light fraction from the tar (JP-B 51-76), and a process of using as a starting material a pitch (hereinafter called "EB pitch") obtained by distilling-off under a reduced pressure a light fraction from a bottom oil produced at the time of producing ethylene, etc. (JP-B 59-10930). Such a starting pitch may be mixed with a viscosity-adjusting additive, preferably an aromatic compound having a boiling point of at least 200° C. and having two or three rings, and the resultant pitch mixture in a heat-melted state is poured into hot water to form spheres. Then, the additive in the spheres is extracted with a solvent to leave a spherical pitch product, which is then infusibilized, carbonized and activated to provide a spherical activated carbon (JP-B 51-76 and JP-B 59-10930).

Of the above-described known processes for producing spherical activated carbon, the process using crude oil-decomposition pitch provides a spherical activated carbon showing good physical properties inclusive of shape and absorptivity characteristic. However, the process requires a preceding process of direct decomposition of crude oil at 2000° C., which is a very sophisticated and complicated process and is not in operation at present, so that it is difficult to secure a fresh supply in a large quantity of the crude oil-decomposition pitch. Further, the process also includes a problem of fluctuation in quality of the crude oil-decomposition pitch since it is produced from a tar obtained by direct decomposition of crude oils which have different composition and include different species and amounts of impurities depending on district of produce. In contrast thereto, the process using EB pitch is advantageous in that it is produced from ethylene bottom tar which in turn is obtained from a process for producing ethylene by decomposition of naphtha (that is a low-boiling point fraction of petroleum), is therefore stable in quality accompanied with extremely little impurities and is readily available. However, the pitch obtained by condensing the ethylene bottom tar and removing a light fraction from the condensed product exhibits good affinity with the porosity-imparting additive of aromatic compounds and the removal of the additive by extraction with a solvent is liable to be insufficient, so that the resultant porous spherical pitch is liable to be provided with insufficient pores. As a result, during oxidation for providing an infusibilized porous spherical pitch, sufficient diffusion of the oxidizing agent to the interior of the pitch becomes difficult, thus being liable to result in insufficient oxidation so that the infusibilization step requires a long time to lower the productivity. Moreover, the process is also accompanied with a difficulty of a low carbonization yield from the EB pitch.

In addition to the above-mentioned processes, there has been also proposed a process wherein an ordinary coal pitch, petroleum-pitch or heavy hydrocarbon oil having a low softening point is mixed with a viscosity-adjusting agent and a softening point-elevating agent such as meta-dinitrobenzene, and the resultant mixture is melt-formed into spheres, followed by extraction of the viscosity-adjusting agent with a solvent showing a low solubility with the pitch and a high solubility with the viscosity-adjusting agent, infusibilization, carbonization and activation, to provide a spherical activated carbon (JP-A 55-27817). However, according to this process, the spherical pitch product is liable to soften and cause agglomeration, presumably due to vaporization of the softening point-elevating agent in the course of temperature increase up to the infusibilization reaction temperature, so that it is difficult to obtain a desired spherical shape of activated carbon.

SUMMARY OF THE INVENTION

In view of the above-mentioned prior art, an object of the present invention is to provide a novel process capable of producing a spherical activated carbon at a high yield by using a pitch of appropriate properties obtained from a heavy hydrocarbon oil, such as petroleum tar or coal tar.

According to the present invention, there is provided a process for producing spherical activated carbon, comprising the steps of:

converting a starting pitch into a porous spherical pitch comprising porous spheres of the starting pitch, and infusibilizing, carbonizing and activating the porous spherical pitch to form a spherical activated carbon;

wherein said starting pitch has a softening point of at least 150° C., a toluene-insoluble content of at least 40% and a property of retaining isotropy even after being subjected to heating at 430° C. for 1 hour.

Preferably, the porous spherical pitch is formed by suspending and dispersing, in hot water, a molten mixture of the starting pitch with an additive comprising an aromatic compound having a boiling point of at least 200° C. and having two or three rings, to recover a spherical pitch product, and extracting the additive from the spherical pitch product to leave the porous spherical pitch.

When the conventional processes of using the crude oil-decomposition pitch and the EB pitch as the starting pitches are compared with the process of the present invention for producing spherical activated carbon, the crude oil pitch and the EB pitch used in the conventional processes are both starting pitches showing anisotropy when heated at 430° C. for 1 hour. However, while the EB pitch shows an excessive solubility with the viscosity-adjusting additive comprising an aromatic compound used for providing a porous pitch product, the crude oil-decomposition pitch shows an appropriate level of non-solubility with the viscosity-adjusting additive so that the additive can be selectively removed by extraction with a solvent. However, the crude oil-decomposition pitch is accompanied with a problem that it is produced through a difficult process of thermal decomposition at a high temperature of ca. 2000° C. as described before. In contrast thereto, according to our study, it has been found that a starting pitch (crosslinked pitch) obtained by subjecting a heavy hydrocarbon oil inclusive of petroleum tar including EB tar or coal tar to an appropriate degree of crosslinking and condensing treatment and having properties of a softening point of at least 150° C., a toluene-insoluble content of at least 40% and a property of retaining isotropy even after heating at 430° C. for 1 hour, is different from the crude oil-decomposition pitch in that it does not show anisotropy even after heating at 430° C. for 1 hour but shows a good balance of solubility-insolubility to a viscosity-adjusting additive comprising an aromatic compound similarly as the crude oil-decomposition pitch, so that the starting pitch is caused to have lower viscosity and softening point when mixed with a viscosity-adjusting additive and can provide a porous spherical pitch suitable as a material for production of spherical activated carbon by subsequent selective removal of the viscosity-adjusting additive by extraction with a solvent. Accordingly, if the porous spherical pitch is infusibilized, carbonized and activated, it is possible to obtain a spherical activated carbon at a high yield. Particularly, as the infusibilized porous pitch or carbonaceous material to be treated with an activation agent such as steam is isotropic and uniform, the activation agent is allowed to uniformly penetrate thereinto to cause the activation reaction, so that a uniform pore structure can be developed easily.

DESCRIPTION OF PREFERRED EMBODIMENTS

In the process for producing a spherical activated carbon according to the present invention, a porous spherical pitch having a softening point of at least 150° C., a toluene-insoluble content of at least 40% and a property of retaining isotropy even after heating at 430° C. for 1 hour (obtained from a starting pitch having similar properties) is infusibilized carbonized and activated. A softening point of at least 150° C. is necessary for smoothly proceeding with the subsequent infusibilization. A toluene-insoluble content of at least 40% is necessary to increase the carbonization yield and accordingly the activated carbon yield. The property of retaining isotropy even after heating (i.e., being heated) at 430° C. for 1 hour is necessary for ensuring an appropriate degree of mutual insolubility with the viscosity-adjusting additive comprising an aromatic compound, as has been explained above.

Hereinbelow, preferred embodiments of the process for producing spherical activated carbon according to the present invention, inclusive of a preferred process for producing the above-mentioned porous spherical pitch, will be described.

The above-mentioned porous spherical pitch may preferably be produced by crosslinking a heavy hydrocarbon oil including as examples thereof petroleum or coal tar, low-softening point pitch and residue oil (EB oil) by-produced during production of ethylene by decomposition of naphtha, etc., to provide a texture not readily resulting in an anisotropic component even after heating, and heat-treatment for condensation and removal of light fraction to obtain a crosslinked and condensed pitch having a controlled softening point and a toluene-insoluble content, and then rendering porous the crosslinked and condensed pitch. The crosslinked and condensed pitch may preferably have as small an impurity content as possible, preferably at most 500 ppm, more preferably at most 100 ppm, in terms of a metallic impurity content. As tars produced in petroleum refining or dry distillation of coal contain much metallic impurities originated from the raw materials or catalysts for the refining, it is preferred to remove such metallic impurities. On the other hand, a tar originated from a bottom oil, etc., produced in a naphtha decomposition step for ethylene production, contains very little impurities and is therefore preferably used. It is possible to use a blend of two or more species of such tars.

The crosslinking and condensation of a heavy hydrocarbon oil may be performed by any method using an oxidizing agent capable of effectively causing the crosslinking and condensing reaction under the reaction conditions, including, e.g., a method of heat-treating a heavy hydrocarbon oil with nitric acid, acetyl nitride, sulfur, etc., added thereto; and a method of reacting a heavy hydrocarbon oil with an oxidizing gas alone or in mixture with a non-oxidizing gas. Suitable examples of the oxidizing gas may include: $O_2$, $O_3$, $NO_2$ and air, and a mixture of two or more species of these can also be used. Suitable examples of the non-oxidizing gas may include: nitrogen, steam and carbon dioxide.

The method of crosslinking (and condensing) a heavy hydrocarbon oil by adding thereto nitric acid, acetyl nitride, sulfur, etc., and heat treating the oil at 150-400° C., is a preferable method as it also has a function of increasing the carbonization yield of the heavy hydrocarbon oil as the starting material and also of the resultant crosslinked pitch to result in a high yield of the activated carbon from the starting material. Particularly, the method of using nitric acid is preferable because it causes a uniform crosslinking reaction and allows easy reaction control.

The crosslinking with nitric acid may be effected by adding nitric acid to a starting heavy hydrocarbon oil to cause a reaction under stirring, and gradually raising the temperature to 150-450° C. preferably 230-400° C., where the system is held for a period of ca. 10 min. to 4 hours. As the addition of nitric acid to the heavy hydrocarbon oil causes an exothermic reaction, it is preferred to add nitric acid gradually and cool the reaction system to keep a temperature of 40° C. or below for 1-3 hours of reaction for the purpose of preventing runaway of the reaction, and thereafter start to raise the temperature. It is possible to remove low-boiling point components present in the reaction system by distilling-off in the course of or after completion of the reaction. By removal of such low-boiling point components, it becomes possible to reduce the volatile matter content evolved in the subsequent carbonization step and reduce the load of the carbonization apparatus to improve the productivity.

The concentration of the nitric acid used is not particularly restricted but may preferably be on the order of 50-68%. The addition amount of the nitric acid varies depending on the hydrogen/carbon atomic ratio (H/C), etc., of the heavy hydrocarbon oil used, and may be adjusted so as to provide a crosslinked pitch satisfying the above-mentioned range of toluene-insoluble content.

The crosslinking and condensation of a heavy hydrocarbon oil with an oxidizing gas may be effected by an air blowing method of heating the heavy hydrocarbon oil while blowing an oxidizing gas, such as air, into the oil. In the air blowing method, the oxidation of the heavy hydrocarbon oil with oxygen and distillation of low-boiling compounds due to blowing-in of air proceed in parallel, so that the reaction mechanism is complex and has not been classified as yet. However, as a result of the air blowing treatment with an oxidizing gas, it is possible to elevate the softening point and increase the toluene-insoluble content without developing an anisotropic texture. As for the temperature for the air blowing, too low a temperature results in a high viscosity of the heavy hydrocarbon oil to fail in uniform reaction. On the other hand, too high a temperature results in a high vapor pressure of the heavy hydrocarbon oil to lower the yield and causes an abrupt reaction leading to runaway of the reaction or excessive condensation of the heavy hydrocarbon oil leading to solidification thereof in the reaction system. The air blowing temperature may preferably be 150-350° C., further preferably 200-300° C. The air blowing reaction is a gas-liquid reaction, and for effective proceeding of the reaction, the reaction may preferably be caused to proceed under pressure so as to promote the dissolution of an oxidizing gas such as air in the heavy hydrocarbon oil. A higher pressure is generally preferred, but in view of a limitation of the apparatus and safety, a pressure of 0.2-2 MPaG (gauge-pressure), particularly 0.3-1 Mpa, is preferred. The amount of the oxidizing gas relative to the heavy hydrocarbon oil is not particularly restricted but, in the case of air used as the oxidizing gas, may preferably be 10-50 liter (NTP), more preferably 20-40 liter (NTP), per 1 kg of the charged heavy hydrocarbon oil.

In the crosslinking and condensing treatment of the heavy hydrocarbon oil, the heat-treatment and removal of light fraction are allowed to proceed as desired to provide a crosslinked (and condensed) pitch with a controlled softening point of at least 150° C., preferably at least 200° C., and a controlled toluene-insoluble content of at least 40%, preferably at least 50%.

To the crosslinked pitch, a viscosity-adjusting additive (i.e., an aromatic compound having a boiling point of at least 200° C. and two or three rings, or a mixture of such aromatic compounds) is added, and the resultant mixture under heating is shaped into a spherical pitch product. Then, the spherical pitch product is subjected to removal and extraction therefrom of the additive with a solvent showing a low solubility to the pitch and a high solubility to the additive, thereby leaving a porous spherical pitch.

The above-mentioned aromatic additive is added for the purpose of converting the spherical pitch product after the shaping into a porous product through removal by extraction of the additive so as to facilitate the subsequent crosslinking infusibilization treatment with oxygen. Such an additive may more specifically be selected as a single species or a mixture of two or more species of aromatic compounds, such as naphthalene, methylnaphthalene, phenyl naphthalene, benzylnaphthalene, methyl-anthracene, phenanthrene, and biphenyl. The additive may preferably be used in an amount of 10-50 wt. %, particularly 20-40 wt. % in the mixture of the pitch and the additive.

The mixing of the pitch and the additive may suitably be performed in a molten state under heating in order to achieve uniform mixing. The resultant mixture of the pitch may preferably be shaped into spheres having particle sizes of at most 2.0 mm. The shaping into spherical pitch may for example be effected in a molten state, or by a sequence of pulverization of the mixture after cooling and stirring the pulverized mixture in hot water. According to a suitable method, similarly as in JP-B 50-18879 or JP-B 51-76, a uniform mixture of the crosslinked and condensed pitch and the viscosity-adjusting additive is dispersed in a molten state in water containing a suspending agent under normal pressure or an elevated pressure to provide spherical pitch. According to a further suitable method, similarly as in JP-B 59-10930, a mixture of the crosslinked and condensed pitch and the viscosity-adjusting additive is melt-extruded into a string of the mixture, followed by stretching, as desired, and cooling, to provide a string of solidified pitch, which is then broken into bar-shaped pieces of pitch having a length/diameter ratio of at most 5.0. Then, the bar-shaped pieces of pitch are dispersed under stirring in hot water containing a suspending agent at a temperature exceeding the softening point of the pitch to recover a spherical pitch product.

Suitable example of the solvent for removal by extraction of the additive from the spherical pitch product (i.e., mixture of the crosslinked pitch and the additive) may include: aliphatic hydrocarbons, such as butane, pentane, hexane and heptane; mixtures principally comprising aliphatic hydrocarbons, such as naphtha and kerosene; and aliphatic alcohols, such as methanol, ethanol, propanol and butanol.

By extracting the additive from the spherical pitch mixture product with such a solvent, it is possible to remove the additive from the mixture product while retaining the spherical shape of the product. At this time, pores are formed at parts from which the additive is removed to leave a porous spherical pitch having a uniform porosity. The porous spherical pitch has a softening point which largely depends on the softening point of the starting pitch. If the porous spherical pitch has too low a softening point, the porous spherical pitch is liable to soften or melt during the heat treatment for infusibilization. A higher softening point is generally preferred, but in order to provide the porous spherical pitch with a higher softening point, it is necessary to proceed with the condensation of the starting pitch, during which some anisotropic component is liable to occur in the pitch. This leads to a difficulty in sphering of the pitch, extraction of the additive and uniform activation in a later activation step. This is undesirable. For this reason, the porous spherical pitch may have a softening point of preferably 150-350° C., further preferably 200-300° C. The toluene-insoluble content has a good correlation with a carbonization yield from the pitch, and a higher toluene-insoluble content tends to provide a higher carbonization yield. Accordingly, the toluene-insoluble content is preferably at least 40%, further preferably at least 50%.

In the process for producing spherical activated carbon according to the present invention, an isotropic pitch obtained through a crosslinking and condensing treatment is used as the starting material. This is effective for facilitating the extraction of the additive from the pitch/additive mixture, and also for preventing the occurrence of anisotropic texture during heat treatment of the porous spherical pitch, thus facilitating the infusibilization treatment while maintaining the isotropic texture. The crosslinked texture of the crosslinked pitch used as the starting material is inherited by the porous spherical pitch obtained therefrom. Accordingly, the crosslinked texture evaluation of the porous spherical pitch means also the texture evaluation of the crosslinked pitch as the starting material. A higher crosslinking degree of the pitch tends to results in a higher temperature at which anisotropic texture appears during heat treatment. Accordingly, a temperature of occurrence of anisotropic texture can be a factor indicating the crosslinking degree of a pitch. From this viewpoint, it is preferred that the porous spherical pitch does not result in an anisotropic component, such as mesophase microspheres, observable through a polarizing microscope after heating at 430° C. for 1 hour in an atmosphere of non-oxidizing gas, such as nitrogen, and the essential condition of the porous spherical pitch used in the present invention is to have such a property.

For the infusibilization of porous spherical pitch, the porous spherical pitch may ordinarily be heat-treated in an oxidizing gas atmosphere. In order to uniformly infusibilize relatively large particles, it is necessary to allow the oxidizing gas to uniformly penetrate into the interior of the particles, and for this purpose, the particles are required to have an appropriate pore structure. In case where the pore structure has not been fully developed, the diffusion of the oxidizing gas takes time to require a long infusibilization time, thus lowering the productivity. Further, in case where the diffusion of the oxidizing gas within the particles is insufficient even at a longer infusibilization time, the internal infusibilization of the particles becomes insufficient to result in the deformation or cracking of the particles due to melting inside the particles during heat treatment for activation. On the other hand, excessively many pores in the particles result in a lower strength and a lower packing density of the particles as such pores formed by extraction of the additive are relatively large pores having a diameter of 10 nm or larger. The porous spherical pitch may preferably have such a pore structure as to include pores providing a total pore volume of 0.06-0.20 ml/g, more preferably 0.08-0.15 ml/g, for a pore diameter range of 3-10000 nm.

The thus-obtained porous spherical pitch may be crosslinked by oxidation using an oxidizing agent as described below. The oxidation for the crosslinking may conveniently be performed at 120-350° C. by using an oxidizing gas, such as $O_2$, $O_3$, $SO_3$, $NO_2$, or air, or a gas mixture thereof diluted with an inert gas, such as nitrogen, carbon dioxide or steam. This is also economically advantageous.

The crosslinking may preferably be performed to such a degree as to provide the porous spherical pitch after the crosslinking (oxidation) with an oxygen content of 8-25 wt. % as a measure.

The resultant infusibilized porous spherical pitch obtained through the above-described steps may be heat-treated at a temperature of at least 600° C. in a non-oxidizing gas atmosphere to obtain a spherical carbon product. Then, carbonization and activation are performed according to conventional methods. In this instance, such a spherical carbon product or the infusibilized porous spherical pitch may be subjected to an activation treatment in an activating gas atmosphere principally comprising a moderately oxidizing gas, such as carbon dioxide or steam (water vapor) to obtain a spherical activated carbon. In other words, it is also possible to simultaneously proceed with the carbonization and activation by subjecting the porous spherical pitch after the infusibilization to reaction with an activating gas atmosphere at a temperature of 600° C. or higher. This is advantageous from the viewpoint of process economy.

Thus, according to the process of the present invention, it is possible to obtain a spherical activated carbon having preferable properties, inclusive of an average particle size of 0.1-1.5 mm, a specific surface area according to the BET method of 500-2500 $m^2$/g, and a packing density of 0.8-0.3 g/ml.

EXAMPLES

Hereinbelow, the present invention will be described more specifically based on Examples and Comparative Examples. Physical properties described herein inclusive of those described below are based on values measured according to the following methods.

[Softening Point]

A sample pitch (inclusive of a porous spherical pitch) is pulverized, and a powdery pitch fraction having passed through a sieve having a mesh opening of 150 μm is recovered as a powdery measurement sample to measure a softening point by using a flow tester ("Model CFT-500D", made by K. K. Shimadzu Seisakusho). After the cylinder temperature of the flow tester has reached 120° C., 1.00 g of the powdery sample is placed in the cylinder to effect 180 seconds of preheating, during which degassing is performed for removing air contained at the gap in the powdery sample. After completion of the preheating, the measurement is started under conditions including: a measurement start temperature of 120° C., a temperature-raising rate of 6° C./min, a cylinder pressure of 0.98 MPaG, a die nozzle aperture diameter of 1.0 mm and a die length of 1.0 mm. As the temperature is raised, the powdery sample is softened to increase the packing rate and reduce the volume of the powdery sample until a certain temperature where the volume reduction stops. On further temperature increase, the sample starts to melt and flow out of the nozzle. Herein, the temperature at which the volume reduction of the sample stops is defined as a softening point of the sample.

[Toluene-Insoluble Content]

A (porous spherical) pitch sample is pulverized to recover a powdery pitch sample having passed through a sieve having a mesh opening of 150 μm. Then, 1.000 g of the powder pitch is placed in a 100 ml-Erlenmeyer flask equipped with a screwed cap, and 100 ml of toluene is also placed in the flask. After being stopped with the cap, the flask is well shaken and placed in a thermostat bath set at 40±5° C. to be held therein for 16 hours. Then, the content of the flask is filtrated, and the toluene-insoluble matter on the filter is dried at 110±5° C. and weighed after cooling by standing to obtain a toluene-insoluble content.

[Observation of Anisotropic Texture]

A (porous spherical) pitch sample is placed in a lateral tube furnace and, after the space being replaced with nitrogen gas, heated to 430° C. in 1 hour, heat-treated at 430° C. for 1 hour and cooled to obtain a sample for observation through a polarizing microscope. Then, a silicone rubber-made mold frame (of 25 mm in diameter) is filled with liquid epoxy resin and the sample for observation is embedded therein, followed by holding at 120° C. for 24 hours to cure the epoxy resin. Then, the cured epoxy resin is polished to expose the sample for observation, which was then observed through a polarizing microscope at a magnification of 500 under right-angle cross nicols. If no anisotropic portion is observed in this state, the pitch sample is judged to be isotropic.

[Specific Surface Area]

A specific surface area meter (e.g., "Flow Sorb II 2300", made by Micromeritics Instrument Corp.) according to a continuous flow-type gas adsorption method is used to measure a gas adsorption capacity of a sample (carbonaceous material) and calculate a specific surface area according to the BET method. More specifically, a sample is packed in a sample tube, through which helium gas containing 30 mol % of nitrogen is caused to flow to effect the following operation for measuring the nitrogen adsorption capacity of the sample. That is, the sample tube is cooled to −196° C. to cause the nitrogen adsorption onto the sample, and then the sample tube is restored to room temperature. Then, the amount of nitrogen liberated from the porous carbonaceous material sample is measured by a thermal conductivity-type detector to obtain an adsorbed gas amount (v). Then, an approximate equation:

$$v_m = 1/(v \cdot (1-x))$$

derived from the BET equation is used to obtain $v_m$ from the measured nitrogen volume v($cm^3$/g-sample) at a relative pressure x (=0.3) according to the BET single-point method using nitrogen adsorption. From the thus-obtained $v_m$-value, a specific surface area $S_{BET}$ is calculated based on the following equation:

$$S_{BET} = 4.35 \times v_m (m^2/g).$$

[Packing Density]

A packing density is measured according to JIS K1474-1991

[Average Particle Size]

A particle size distribution of sample particles is measured by using a laser diffraction-type particle size distribution measurement apparatus ("SALD-3000S", made by K. K. Shimadzu Seisakusho), and a particle size giving cumulatively 50% by volume of the particles on the distribution is determined as an average particle size of the sample particles.

[Mercury Porosimeter Measurement]

A pore-volume mercury porosimeter according to the mercury injection method ("AUTOPORE 9200", made by Micromeritics Instrument Corp.) is used to measure a pore volume-diameter distribution in the following manner.

A sample of carbonaceous material is placed in a sample vessel, which is then evacuated for 30 min. at a pressure of at most 2.67 Pa. Then, mercury is introduced into the sample vessel and gradually injected into pores under a gradually increasing pressure (up to a maximum pressure of 414 MPa). From a relationship between pressure P and injected volume of mercury during the measurement, a pore volume distribution of the carbonaceous material sample is derived versus pore diameter D as a variant by using formulae described below. The volume of mercury injected from a pressure (0.08 MPa) corresponding to a pore diameter of 15 μm to the maximum pressure (414 MPa; corresponding to a pore diameter of 3 nm) is measured.

Formulae for pore diameter calculation are as follows. In case where mercury is injected (pressurized) into a cylindrical pore having a diameter D under a pressure P, the following equation is given based on a balance between a surface tension and a pressure acting on a sectional area of the pore:

$$-\pi D \gamma \cdot \cos \theta = \pi (D/2)^2 P,$$

wherein γ represents a surface tension of the mercury, and θ denotes a contact angle between the mercury and the pore well. Accordingly, $$D = (-4\gamma \cdot \cos \theta)/P.$$

Herein, the surface tension (γ) of mercury is assumed to be 484 dyn/cm, the contact angle (θ) between mercury and carbon is assumed to be 130 deg.; and the pressure P and the diameter D are expressed in the units of MPa and μm, respectively, whereby the above equation is reduced to $$D = 1.27/P.$$

The pore volume in a pore diameter range of 3-10000 nm referred to herein corresponds to a volume of mercury injected in a mercury injection pressure range of from 0.127 MPa to 414 MPa.

[Oxygen Content]

The contents of hydrogen, carbon and nitrogen are measured in terms of wt. %, respectively, according to elementary analysis, and from the measured values, an oxygen content (wt. %) is calculated according to the following formula.

Oxygen content (wt. %)=100−(hydrogen content (wt. %)+carbon content (wt. %)+nitrogen content (wt. %))

[Carbonization Yield (wt. %)]

A carbonization yield listed for each example (except for the one for Reference Example wherein pitch was used as the starting material) is a ratio (wt. %) of the weight of a carbonized product obtained from a starting heavy oil, through a pitch and after heat-treatment at 800° C. for 30 min. to the weight of the starting heavy oil. For the Reference Example, the carbonization yield (%) was calculated by (carbonized product weight/starting pitch weight)×100 (%).

[Metallic Impurity Content]

A metallic impurity content (wt. ppm) for each example was calculated based on a weight of ash remaining after burning 100 g of a sample pitch placed in a quartz container in air with respect to the weight (100 g) of the sample pitch.

Example 1

In a stainless steel-made pressure vessel having an inner volume of 9 liter, 6.5 kg of ethylene bottom oil by-produced during ethylene production and having a specific gravity (ratio of weight of a sample at 15° C./weight of pure water of an equal volume at 4° C.) of 1.08 was charged, and then air was blown into the vessel from the bottom of the vessel at a rate of 2.0-2.5 liter/min. to effect an air blowing reaction for 8 hours at 230-250° C. under a pressure of 0.4 MPaG to obtain 5.5 kg of air-blown tar. Then, 5.0 kg of the air-blown tar was thermally condensed at 395° C., followed by distilling-off of the light fraction under a reduced pressure to obtain 2.5 kg of an air-blown pitch. The pitch exhibited a softening point of 208° C., a toluene-insoluble content of 58%, a metallic impurity content of 70 ppm and optical isotropy. The optical isotropy was retained even after heat treatment at 430° C. for 1 hour.

Then, 2.00 kg of the air-blown pitch and 0.95 kg of naphthalene were charged in a pressure vessel having an inner volume of 5 liter and equipped with a stirring blade and, after melt mixing at 200° C. and cooling to 140-160° C., extruded into a string-shaped product, which was then broken into bar-shaped pieces having a length/diameter ratio of ca. 1-2. The broken pieces were then charged into an aqueous solution containing 0.23 wt. % of polyvinyl alcohol (at a saponification degree of 88%) and heated at 93° C. and dispersed under stirring therein to be sphered. After being cooled, the polyvinyl alcohol aqueous solution was replaced by water to obtain a slurry of spherical pitch product. A major proportion of water was removed by filtration, and the naphthalene in the slurried spherical pitch was removed by extraction with n-hexane in an amount of ca. 6 times by weight of the slurried spherical pitch to obtain a porous spherical pitch. The porous spherical pitch exhibited optical isotropy. The optical isotropy was retained even after heat treatment at 430° C. for 1 hour.

A fluidized bed of the thus-obtained porous spherical pitch was formed, while flowing heated air thereinto, and heated from room temperature to 150° C. in 1 hour, then heated from 150° C. to 260° C. at a temperature-raising rate of 20° C./hr and held at 260° C. for 1 hour to be oxidized, thus being converted into a thermally infusibilized porous spherical pitch. Then, the infusibilized porous spherical pitch, in the form of a fluidized bed, was activated at 850° C. for 150 min. in a nitrogen gas atmosphere containing 50 vol. % of steam (water vapor) to obtain a spherical activated carbon.

Some physical properties of the above-formed porous spherical pitch, infusibilized (porous spherical) pitch and spherical activated carbon as well as the starting pitch and tar are summarized in Table 1 appearing hereinafter together with those of Examples and Comparative Examples described below.

Example 2

In a stainless steel-made pressure vessel having an inner volume of 9 liter, 6.5 kg of ethylene bottom oil (specific gravity=1.08) by-produced during ethylene production was charged, and then air was blown into the vessel from the bottom of the vessel at a rate of 2.0-2.5 liter/min. to effect an air blowing reaction for 8 hours at 230-250° C. under a pressure of 0.25 MPaG to obtain 5.3 kg of air-blown tar. Then, 5.0 kg of the air-blown tar was thermally condensed at 395° C., followed by distilling-off of the light fraction under a reduced pressure to obtain 2.3 kg of an air-blown pitch. The pitch exhibited a softening point of 203° C., a toluene-insoluble content of 56% and optical isotropy. The optical isotropy was retained even after heat treatment at 430° C. for 1 hour.

Then, 2.00 kg of the air-blown pitch and 0.95 kg of naphthalene were charged in a pressure vessel having an inner volume of 5 liter and equipped with a stirring blade and, after melt mixing at 200° C. and cooling to 140-160° C., extruded into a string-shaped product, which was then broken into bar-shaped pieces having a length/diameter ratio of ca. 1-2. The broken pieces were then charged into an aqueous solution containing 0.23 wt. % of polyvinyl alcohol (at a saponification degree of 88%) and heated at 93° C., and dispersed under stirring therein to be sphered. After being cooled, the polyvinyl alcohol aqueous solution was replaced by water to obtain a slurry of spherical pitch product. A major proportion of water was removed by filtration, and the naphthalene in the slurried spherical pitch was removed by extraction with n-hexane in an amount of ca. 6 times by weight of the slurried spherical pitch to obtain a porous spherical pitch. The porous spherical pitch exhibited isotropy, which was retained even after heat treatment at 430° C. for 1 hour.

A fluidized bed of the thus-obtained porous spherical pitch was formed, while flowing heated air thereinto, and heated from room temperature to 150° C. in 1 hour, then heated to 240° C. at a temperature-raising rate of 20° C./hr and held at 240° C. for 1 hour to be oxidized, thus being converted into a thermally infusibilized porous spherical pitch. Then, the infusibilized porous spherical pitch, in the form of a fluidized bed, was activated at 850° C. for 220 min. in a nitrogen gas atmosphere containing 50 vol. % of steam (water vapor) to obtain a spherical activated carbon.

Example 3

In a 20 liter-reaction vessel equipped with a stirrer, 15 kg of ethylene bottom oil (specific gravity=1.08) was charged, and 2 kg of 61%-nitric acid was added thereto while being cooled under stirring at 40° C., followed by 2 hours of reaction at that temperature. Then, the system was maintained at 80° C. for 1 hour and subjected to thermal condensation at 395° C., and a light fraction was distilled off under vacuum to obtain a nitric acid-oxidized pitch at a yield of 36.1%. The pitch exhibited a softening point of 215° C., a toluene-insoluble content of 59% and optical anisotropy. The optical isotropy was retained even after heat treatment at 430° C. for 1 hour.

Then, 68 kg of the nitric acid-oxidized pitch and 32 kg of naphthalene were charged in a pressure vessel having an inner volume of 300 liter and equipped with a stirring blade and, after melt mixing at 200° C. and cooling to 140-160° C., extruded into a string-shaped product, which was then broken into bar-shaped pieces having a length/diameter ratio of ca. 1-2. The broken pieces were then charged into an aqueous solution containing 0.23 wt. % of polyvinyl alcohol (at a saponification degree of 88%) and heated at 93° C., and dispersed under stirring therein to be sphered. After being cooled, the polyvinyl alcohol aqueous solution was replaced by water to obtain a slurry of spherical pitch product. A major proportion of water was removed by filtration, and the naphthalene in the slurried spherical pitch was removed by extraction with n-hexane in an amount of ca. 6 times by weight of the slurried spherical pitch to obtain a porous spherical pitch. The porous spherical pitch exhibited isotropy, which was retained even after heat treatment at 430° C. for 1 hour.

A fluidized bed of the thus-obtained porous spherical pitch was formed, while flowing heated air thereinto, and heated from room temperature to 150° C. in 1 hour, then heated to 260° C. at a temperature-raising rate of 20° C./hr and held at 260° C. for 1 hour to be oxidized, thus being converted into a thermally infusibilized porous spherical pitch. Then, the infusibilized porous spherical pitch, in the form of a fluidized bed, was activated at 850° C. for 300 min. in a nitrogen gas atmosphere containing 50 vol. % of steam (water vapor) to obtain a spherical activated carbon.

Example 4

Coal tar was heated to 120° C., centrifuged for separation of solid water and then, after being heated again to 120° C., subjected to pressure-filtration to be purified. Then, 6.5 kg of the thus-purified coal tar (specific gravity=1.13) was charged in a 9 liter-stainless steel-made pressure vessel, and then air was blown into the vessel from the bottom of the vessel at a rate of 2.0-2.5 liter/min. to effect an air blowing reaction for 8 hours at 230-250° C. under a pressure of 0.5 MPaG to obtain 5.4 kg of air-blown tar. Then, 5.0 kg of the air-blown tar was thermal condensed at 395° C., followed by distilling-off of the light fraction under a reduced pressure to obtain 1.6 kg of an air-blown pitch. The pitch exhibited a softening point of 240° C., a toluene-insoluble content of 70%, a metallic impurity content of 90 ppm and optical isotropy. The optical isotropy was retained even after heat treatment at 430° C. for 1 hour.

Then, 2.00 kg of the air-blown pitch and 1.08 kg of naphthalene were charged in a pressure vessel having an inner volume of 5 liter and equipped with a stirring blade and, after melt mixing at 200° C. and cooling to 140-160° C., extruded into a string-shaped product, which was then broken into bar-shaped pieces having a length/diameter ratio of ca. 1-2. The broken pieces were then charged into an aqueous solution containing 0.23 wt. % of polyvinyl alcohol (at a saponification degree of 88%) and heated at 93° C. and dispersed under stirring therein to be sphered. After being cooled, the polyvinyl alcohol aqueous solution was replaced by water to obtain a slurry of spherical pitch product. A major proportion of water was removed by filtration, and the naphthalene in the slurried spherical pitch was removed by extraction with n-hexane in an amount of ca. 6 times by weight of the slurried spherical pitch to obtain a porous spherical pitch. The porous spherical pitch exhibited isotropy, which was retained even after heat treatment at 430° C. for 1 hour.

A fluidized bed of the thus-obtained porous spherical pitch was formed, while flowing heated air thereinto, and heated from room temperature to 150° C. in 1 hour, then heated to 150° C. to 260° C. at a temperature-raising rate of 20° C./hr and held at 260° C. for 1 hour to be oxidized, thus being converted into a thermally infusibilized porous spherical pitch. Then, the infusibilized porous spherical pitch, in the form of a fluidized bed, was activated at 850° C. for 160 min. in a nitrogen gas atmosphere containing 50 vol. % of steam (water vapor) to obtain a spherical activated carbon.

Comparative Example 1

5.00 kg of ethylene bottom oil (specific gravity=1.08) was thermally condensed at 395° C., and a light fraction was distilled off under a reduced pressure to obtain 1.03 kg of EB (ethylene bottom) pitch (yield=20.5%). The EB pitch exhibited a softening point of 178° C., a toluene-insoluble content of 30.1% and optical isotropy, but, after heat treatment at 430° C. for 1 hour, resulted in mesophase microspheres of ca. 20 μm in diameter by observation through a polarizing microscope.

Then, 68 kg of the EB pitch and 32 kg of naphthalene were charged in a pressure vessel having an inner volume of 300 liter and equipped with a stirring blade and, after melt mixing at 200° C. and cooling to 140-160° C., extruded into a string-shaped product, which was then broken into bar-shaped pieces having a length/diameter ratio of ca. 1-2. The broken pieces were then charged into an aqueous solution containing 0.23 wt. % of polyvinyl alcohol (at a saponification degree of 88%) and heated at 93° C. and dispersed under stirring therein to be sphered. After being cooled, the polyvinyl alcohol aqueous solution was replaced by water to obtain a slurry of spherical pitch product. A major proportion of water was removed by filtration, and the naphthalene in the slurried spherical pitch was removed by extraction with n-hexane in an amount of ca. 6 times by weight of the slurried spherical pitch to obtain a porous spherical pitch. The porous spherical pitch exhibited isotropy, but, after being heated at 430° C. for 1 hour, resulted in anisotropy similarly as the starting pitch A fluidized bed of the thus-obtained porous spherical pitch was formed, while flowing heated air thereinto, and heated from room temperature to 150° C. in 1 hour, then heated to 260° C. at a temperature-raising rate of 20° C./hr and held at 260° C. for 1 hour to be oxidized, thus being converted into a thermally infusibilized porous spherical pitch. Then, the infusibilized porous spherical pitch, in the form of a fluidized bed, was heated at 850° C. for 150 min. in a nitrogen gas atmosphere containing 50 vol. % of steam (water vapor) in order to try to obtain a spherical activated carbon, whereas internal foaming was caused during the heating, thus failing to provide a good shape of spherical activated carbon. This is presumably because the development of pore structure in the porous spherical pitch was insufficient, so that the infusibilization failed to uniformly proceed in the particles, thus leaving an internal insufficiently infusibilized portion which was foamed during the heating step for the activation.

Comparative Example 2

A fluidized bed of porous spherical pitch obtained in the same manner as in Comparative Example 1 was formed, while flowing heated thereinto, and heated from room temperature to 150° C., then heated from 150° C. to 260° C. at temperature-raising rate of 1° C./hr and held at 260° C. for 1 hour to be oxidized, thus being converted into a thermally infusibilized porous spherical pitch. Then, the infusibilized porous spherical pitch, in the form of a fluidized bed, was activated at 850° C. for 150 min. in a nitrogen gas atmosphere containing 50 vol. % of steam (water vapor) to obtain a spherical activated carbon.

Comparative Example 3

5.00 kg of ethylene bottom oil (specific gravity=1.08) was thermally condensed at 415° C., and a light fraction was distilled off under a reduced pressure to obtain 0.95 kg of EB (ethylene bottom) pitch (yield=19%). The EB pitch exhibited a softening point of 215° C., a toluene-insoluble content of 43% and optical anisotropy. Then, 68 kg of the EB pitch and 32 kg of naphthalene were charged in a 300 liter-pressure vessel equipped with a stirring blade and melt-kneaded at 200° C., whereas uniform mixing was failed due to poor mutual solubility of the anisotropic pitch and naphthalene. Thus, the control of the softening point, etc., of the pitch mixture was failed, and subsequent steps of operation were impossible.

Reference Example

Crude oil was thermally decomposed with steam at 2000° C. to obtain a crude oil-decomposition pitch, which exhibited a softening point of 192° C. and a toluene-insoluble content of 68.2%. The pitch exhibited optical isotropy but, after being heated at 430° C. for 1 hour, exhibited anisotropic texture including both mesophase spheres of ca. 50 μm in diameter and flow-pattern anisotropic texture by observation through a polarizing microscope. Then, 60 kg of the crude oil-decomposition pitch and 20 kg of naphthalene were charged in a 300 liter-pressure vessel equipped with a stirring blade and, after melt mixing at 200° C. and cooling to 140-160° C., extruded into a string-shaped product, which was then broken into bar-shaped pieces having a length/diameter ratio of ca. 1-2. The broken pieces were then charged into an aqueous solution containing 0.23 wt. % of polyvinyl alcohol (at a saponification degree of 88%) and heated at 93° C., and dispersed under stirring therein to be sphered. After being cooled, the polyvinyl alcohol aqueous solution was replaced by water to obtain a slurry of spherical pitch product. A major proportion of water was removed by filtration, and the naphthalene in the slurried spherical pitch was removed by extraction with n-hexane in an amount of ca. 6 times by weight of the slurried spherical pitch to obtain a porous spherical pitch. The porous spherical pitch exhibited isotropy, but, similarly as the starting pitch, exhibited anisotropic texture after being heated at 430° C. for 1 hour.

A fluidized bed of the thus-obtained porous spherical pitch was formed, while flowing heated air thereinto, and heated from room temperature to 150° C. in 1 hour, then heated from 150° C. to 300° C. at a temperature-raising rate of 20° C./hr and held at 300° C. for 1 hour to be oxidized, thus being converted into a thermally infusibilized porous spherical pitch. Then, the infusibilized porous spherical pitch, in the form of a fluidized bed, was activated at 850° C. for 150 min. in a nitrogen gas atmosphere containing 50 vol. % of steam (water vapor) to obtain a spherical activated carbon.

Physical properties of the porous spherical pitch, infusibilized (porous spherical) pitch and spherical activated carbon as well as the starting pitch and tar obtained in the above Examples are summarized in the following Table 1.

TABLE 1

|  |  | Example | | | | | | | |
|---|---|---|---|---|---|---|---|---|---|
|  |  | 1 | 2 | 3 | 4 | Comp. 1 | Comp. 2 | Comp. 3 | Reference *[1] |
| Tar | Starting heavy oil | EB oil | EB oil | EB oil | Coal tar | EB oil | EB oil | EB oil |  |
|  | Crosslinking method | Air Blowing | Air Blowing | with $HNO_3$ | Air Blowing | none | none | none | none |
| Pitch | Softening point (° C.) | 208 | 203 | 215 | 240 | 178 | 178 | 215 | 192 |
|  | Toluene-insoluble content (wt. %) | 58 | 56 | 59 | 70 | 30 | 30 | 43 | 68 |
|  | Pitch yield (wt. %) | 39 | 35 | 37 | 15 | 21 | 21 | 19 | 35 |
|  | Carbonization yield (wt. %) | 23 | 20 | 22 | 11 | 6 | 6 | 8 | (65) |
| Porous spherical pitch | Dav. *[2] (μm) | 730 | 880 | 566 | 880 | 600 | 600 | (Not obtained) | 700 |
|  | Softening point (° C.) | 248 | 255 | 270 | 290 | 220 | 220 |  | 225 |
|  | Toluene-insoluble content (wt. %) | 60 | 59 | 65 | 75 | 35 | 35 |  | 70 |
|  | Pore volume (ml/g) | 0.11 | 0.16 | 0.12 | 0.12 | 0.05 | 0.05 |  | 0.21 |
|  | Isotropy or Anisotropy *[3] | Isotropy | Isotropy | Isotropy | Isotropy | Anisotropy | Anisotropy |  | Anisotropy |

TABLE 1-continued

| | | Example | | | | | | | |
|---|---|---|---|---|---|---|---|---|---|
| | | 1 | 2 | 3 | 4 | Comp. 1 | Comp. 2 | Comp. 3 | Reference [1] |
| Infusibilized pitch | Dav. [2] (μm) | 700 | 850 | 550 | 750 | 580 | 580 | — | 680 |
| | Oxygen content (wt. %) | 1.5 | 13.5 | 16 | 16 | 9 | 13 | — | 20 |
| Spherical activated carbon | Dav. [2] (μm) | 500 | 620 | 367 | 600 | — | 375 | — | 570 |
| | Shape | Good | Good | Good | Good | Foaming | Good | — | Good |
| | Specific surface area (m$^2$/g) | 1350 | 1630 | 1980 | 1390 | — | 1290 | — | 1190 |
| | Packing density (g/ml) | 0.6 | 0.5 | 0.4 | 0.6 | — | 0.6 | — | 0.6 |

[1] Crude oil-decomposition pitch was used as the starting material.
[2] Average particle size
[3] Isotropy or Anisotropy after heat-treatment at 430° C. for 1 hour.

INDUSTRIAL APPLICABILITY

As described above, according to the process for producing spherical activated carbon of the present invention, it is possible to provide a spherical activated carbon with good properties by using an isotropic porous spherical pitch obtained from a starting heavy hydrocarbon oil, such as petroleum tar, coal tar or ethylene bottom oil through a moderate process, and subjecting the isotropic porous spherical pitch to infusibilization, carbonization and activation.

What is claimed is:

1. A process for producing spherical activated carbon, comprising the steps of:
    crosslinking and condensing a heavy hydrocarbon oil under an elevated pressure by blowing therein an oxidizing gas alone or in mixture with a non-oxidizing gas to provide a starting pitch,
    forming the starting pitch into a porous spherical pitch comprising porous spheres of the starting pitch, and
    infusibilizing, carbonizing and activating the porous spherical pitch to form a spherical activated carbon;
    wherein said starting pitch has a softening point of at least 150° C., a toluene-insoluble content of at least 40% and a property of retaining isotropy even after being subjected to heating at 430° C. for 1 hour; and
    wherein the forming step includes suspending and dispersing a molten mixture of the starting pitch with an additive comprising an aromatic compound having a boiling point of at least 200° C. and having two or three rings in hot water to recover a spherical pitch product, and extracting the additive from the spherical pitch product to leave the porous spherical pitch.

2. A process according to claim 1, wherein the heavy hydrocarbon oil has been obtained as a residue oil by-produced during production of ethylene by decomposition of naphtha.

3. A process according to claim 1, wherein the starting pitch has a metallic impurity content of at most 500 ppm.

4. A process according to claim 1, wherein the porous spherical pitch comprises spheres having an average particle size of 0.1-2.0 mm and including pores providing a total pore volume of 0.06-0.20 ml/g for a pore diameter range of 3-10000 nm.

5. A process according to claim 1, wherein the porous pitch after the infusibilizing comprises spheres having an average particle size of 0.1-2.0 mm and has an oxygen content of 8-25 wt. % as measured by elementary analysis.

6. A process according to claim 1, wherein the elevated pressure is 0.2-2 MPaG (gauge-pressure).

* * * * *